(12) United States Patent
Zeng et al.

(10) Patent No.: US 8,437,721 B2
(45) Date of Patent: May 7, 2013

(54) JAMMER DETECTION BASED ADAPTIVE PLL BANDWIDTH ADJUSTMENT IN FM RECEIVER

(75) Inventors: Yi Zeng, Fremont, CA (US); Tzu-wang Pan, Saratoga, CA (US); I-Hsiang Lin, Mountian View, CA (US); Jeremy Dunworth, San Diego, CA (US); Pushp Trikha, San Diego, CA (US); Rahul Apte, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 942 days.

(21) Appl. No.: 12/430,106

(22) Filed: Apr. 26, 2009

(65) Prior Publication Data
US 2010/0273442 A1   Oct. 28, 2010

(51) Int. Cl.
*H04B 1/06* (2006.01)
*H04B 7/00* (2006.01)

(52) U.S. Cl.
USPC .................. 455/260; 455/334; 455/550.1

(58) Field of Classification Search ......... 455/255–260, 455/313, 323, 334, 550.1
See application file for complete search history.

(56) References Cited

U.S. PATENT DOCUMENTS

| 4,479,091 | A | 10/1984 | Yoshisato |
| 4,654,884 | A * | 3/1987 | Sakai et al. ............... 455/183.2 |
| 6,819,197 | B2 | 11/2004 | Maldonado |
| 7,130,329 | B2 | 10/2006 | Glazko et al. |
| 7,269,144 | B2 * | 9/2007 | Gardenfors et al. ......... 370/280 |
| 7,660,569 | B2 | 2/2010 | Xiong |
| 7,808,326 | B2 * | 10/2010 | Sogawa et al. ................. 331/16 |
| 2005/0221790 | A1 * | 10/2005 | Persico et al. ............. 455/343.2 |
| 2008/0164918 | A1 | 7/2008 | Stockstad et al. |

FOREIGN PATENT DOCUMENTS

| EP | 1560390 | 8/2005 |
| EP | 1629654 A2 | 3/2006 |
| WO | WO2004110021 | 12/2004 |
| WO | WO2005099109 A1 | 10/2005 |

OTHER PUBLICATIONS

International Search Report and Written Opinion—PCT/US2010/032455, International Search Authority—European Patent Office—Jul. 5, 2010.

* cited by examiner

*Primary Examiner* — Nhan Le
(74) *Attorney, Agent, or Firm* — Kevin T. Cheatham

(57) ABSTRACT

A frequency synthesizer within an FM receiver employs a Phase-Locked Loop (PLL) to generate a Local Oscillator (LO) signal. The LO signal is supplied to a mixer. The FM receiver also includes jammer detection functionality. If no jammer is detected, then the loop bandwidth of the PLL is set to have a relatively high value, thereby favoring suppression of in-band residual FM. If a jammer is detected, then the loop bandwidth of the PLL is set to have a relatively low value, thereby favoring suppression of out-of-band SSB phase noise. By adaptively changing loop bandwidth depending on whether a jammer is detected, performance requirements on sub-circuits within the PLL can be relaxed while still satisfying in-band residual FM and out-of-band SSB phase noise requirements. By allowing the VCO of the PLL to generate more phase noise due to the adaptive changing of loop bandwidth, VCO power consumption can be reduced.

28 Claims, 11 Drawing Sheets

VCO NOISE CONTRIBUTION TO TOTAL PHASE NOISE

CHARGE PUMP NOISE CONTRIBUTION TO TOTAL PHASE NOISE

LOOP FILTER NOISE CONTRIBUTION TO TOTAL PHASE NOISE

JAMMER DETECTION BASED PLL BANDWIDTH
ADJUSTMENT METHOD

| C1 | 25PF – 220 PF | 16 STEPS |
| R1 | 15KΩ – 60KΩ | 16 STEPS |
| C2 | 4PF – 18PF | 8 STEPS |
| R2 | <1KΩ – 14KΩ | 2 STEPS |
| C3 | 0PF – 5.4PF | 4 STEPS |
| $I_{CP}$ | 39μA – 85μA | 2 STEPS |

SETTINGS

| PARAMETER | 125 KHZ BW (THIS CONFIGURATION IS USED IF A JAMMER IS DETECTED) | 183 KHZ BW (THIS CONFIGURATION IS USED IF NO JAMMER IS DETECTED) |
|---|---|---|
| Fvco (MHz) | 3126.86 | 3126.86 |
| Kvco (MHz/Volt) | 60.5 | 60.5 |
| Icp (Amperes) | 39.38E-6 | 88.59E-6 |
| R1 (Ohms) | 44.36E+3 | 27.95E+3 |
| R2 (Ohms) | 14.98E+3 | 14.98+3 |
| C1 (Farads) | 194E-12 | 194E-12 |
| C2 (Farads) | 17E-12 | 17E-12 |
| C3 (Farads) | 6E-12 | 6E-12 |
|  |  |  |
| CLOSED LOOP BANDWIDTH (Hz) | 154.8E+3 | 225.4E+3 |
| PHASE MARGIN | 57.36 | 56.13 |
| SSB PHASE NOISE (AT 200KHz) | -114.0 | -112.5 |
| SSB PHASE NOISE (AT 400KHz) | -124.3 | -122.8 |
| SSB PHASE NOISE (AT 500KHz) | -127.1 | -125.6 |
| RESIDUAL FM MONO (300 - 5KHz) | 2.3 | 1.3 |
| RESIDUAL FM STEREO (33KHz - 43KHz) | 76.5 | 45.6 |
| RESIDUAL FM RDS (55KHz - 59KHz) | 57.4 | 44.4 |

JAMMER DETECTION BASED ADAPTIVE PLL BANDWIDTH ADJUSTMENT IN FM RECEIVER

BACKGROUND INFORMATION

1. Technical Field

The present disclosure relates to Phase-Locked Loop (PLL) based frequency synthesizers within Frequency Modulation (FM) receivers.

2. Background Information

A miniaturized and integrated FM (Frequency Modulation) radio transceiver generally involves the use of a frequency synthesizer. The frequency synthesizer typically includes a Phase-Locked Loop (PLL) and therefore may be referred to as a PLL-based frequency synthesizer. If, for example, an integrated FM radio transceiver is receiving a radio transmission, then the PLL-based frequency synthesizer within the transceiver generates a Local Oscillator (LO) signal. The LO signal is supplied to a mixer that is part of a demodulator of an FM receiver portion of the transceiver. If, on the other hand, the FM radio transceiver is transmitting a radio transmission, then the same PLL-based frequency synthesizer is used to output an FM modulated signal. The FM modulated signal is then amplified and supplied to the antenna for transmission. Of various requirements imposed on the design of such a PLL-based frequency synthesizer within an FM receiver, there are two requirements of particular importance: 1) In-band residual FM, and 2) Out-of-band SSB (Single Side Band) phase noise.

Table 1 below sets forth an example of requirements that may be imposed on a LO signal output by a PLL-based frequency synthesizer within an FM transceiver.

TABLE 1

| Specification | Comments | Max | Units |
| --- | --- | --- | --- |
| In-Band Residual FM Mono | 300 Hz-5 KHz | 19 | Hzrms |
| In-Band Residual FM Stereo L-R | 33 KHz-43 KHz | 67 | Hzrms |
| In-Band Residual FM Stereo RDS | 55 KHz-59 KHz | 67 | Hzrms |
| Out-of-Band SSB Phase Noise | at 200 KHz | −112 | dBc/Hz |
| | at 400 KHz | −124 | dBc/Hz |
| | at >500 KHz | −126 | dBc/Hz |

FIG. 1 (Prior Art) is a diagram that shows a 59 KHz wide portion of the FM band above an FM carrier frequency. For each FM broadcast radio station, there is such a 59 KHz wide portion above the FM carrier, and one such 59 KHz wide portion below the FM carrier. Generally speaking, in-band residual FM is found by integrating phase noise in the LO signal over one of the particular frequency range portions of FIG. 1. For example, in-band residual FM monotone is a measure of SSB phase noise in the monotone frequency range 1 of FIG. 1. In-band residual FM monotone (300 Hz to 5 KHz) can be determined by integrating SSB (Single Side Band) phase noise over the 300 Hz to 5 KHz range in accordance with Equation (1) below, where L(f) is measured PLL phase noise and has units of dBc/Hz:

$$FMres_{Mono} = \sqrt{2 \cdot \int_{300\,Hz}^{5000\,Hz} f^2 \cdot 10^{\frac{L(f)}{10}} df} \qquad \text{Eq. (1)}$$

In-band residual FM stereo is a measure of SSB phase noise in the stereo frequency range 2 of FIG. 1. In-band residual FM stereo can be determined by integrating SSB phase noise over the 33 KHz to 43 KHz frequency range in accordance with Equation (2) below:

$$FMres_{Stereo\_LR} = \sqrt{2 \cdot \int_{33000\,Hz}^{43000\,Hz} f^2 \cdot 10^{\frac{L(f)}{10}} df} \qquad \text{Eq. (2)}$$

In-band residual FM RDS (Radio Data System) is a measure of phase noise in the RDS/RBDS frequency range 3 of FIG. 1. In-band residual FM RDS can be determined by integrating SSB phase noise over the 55 KHz to 59 KHz frequency range in accordance with Equation (3) below:

$$FMres_{RDS} = \sqrt{2 \cdot \int_{55000\,Hz}^{59000\,Hz} f^2 \cdot 10^{\frac{L(f)}{10}} df} \qquad \text{Eq. (3)}$$

The quality of audio output by an FM receiver is generally limited by the in-band residual FM. When no jammer is present, residual FM is usually the limiting performance parameter and determines the effective audio Signal-to-Noise Ratio (SNR) and hence audio quality provided that the Carrier-to-Noise Ratio (CNR) is high. When a jammer is present, however, then the quality of the audio output by the FM receiver is generally limited by out-of-band SSB phase noise. The jammer and the wanted signal being received are FM demodulated, giving rise to audio distortion due to reciprocal mixing. This audio distortion dominates the deleterious effect of the in-band residual FM phase noise. In one example, a jammer is a signal that is of such a frequency and power that it reciprocally mixes with phase noise of the LO signal in the receiver in such a way that substantial in-band signal-to-noise degradation results. The transmitted FM signal of an adjacent FM radio channel may be an example of one such jammer.

In a conventional miniaturized and integrated FM receiver involving a PLL-based frequency synthesizer, the various components of the PLL-based frequency synthesizer are generally sized and tuned to achieve acceptable performance under both the no jammer condition and the jammer condition.

SUMMARY

A frequency synthesizer within an FM receiver employs a Phase-Locked Loop (PLL) to generate a Local Oscillator (LO) signal. The LO signal is supplied to a mixer in the process of demodulating an FM signal. The FM receiver also includes jammer detection functionality. In accordance with one novel aspect, the loop bandwidth of the PLL is changed based at least in part on whether the jammer detection functionality detects a jammer.

In one specific example, if no jammer is detected by the jammer detection functionality, then the loop bandwidth of the PLL is set to have a relatively high loop bandwidth. The relatively high PLL loop bandwidth favors reducing in-band residual FM. If, however, a jammer is detected by the jammer detection functionality, then the loop bandwidth of the PLL is set to have a relatively low loop bandwidth. The relatively low PLL loop bandwidth favors suppression of out-of-band SSB phase noise. By automatically and adaptively changing the loop bandwidth of the PLL depending on whether a jammer is detected, performance requirements on sub-circuits of the PLL are relaxed while still satisfying in-band residual FM requirements and out-of-band SSB phase noise requirements. For example, achieving low Voltage Controlled Oscillator (VCO) phase noise often requires that the VCO sub-circuit within the PLL consume a relatively large amount of power or that a large layout area high quality factor spiral inductor be used in the LC tank of the VCO. By allowing the VCO sub-circuit to generate more phase noise due to the adaptive changing of PLL loop bandwidth described above, the amount of power consumed by the VCO in an FM receiver can be reduced while still satisfying performance requirements imposed on the FM receiver. Similarly, by allowing the VCO sub-circuit to generate more phase noise due the adaptive changing of PLL loop bandwidth, the size of the PLL can be smaller due to not having to use a large layout area high quality factor spiral inductor.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

FIG. 11 is a table that sets forth how the circuit elements of loop filter 140 and charge pump 139 should be set to configure the PLL to have a relatively high PLL loop bandwidth setting, and to configure the PLL to have a relatively low PLL bandwidth setting.

DETAILED DESCRIPTION

Figure 1:
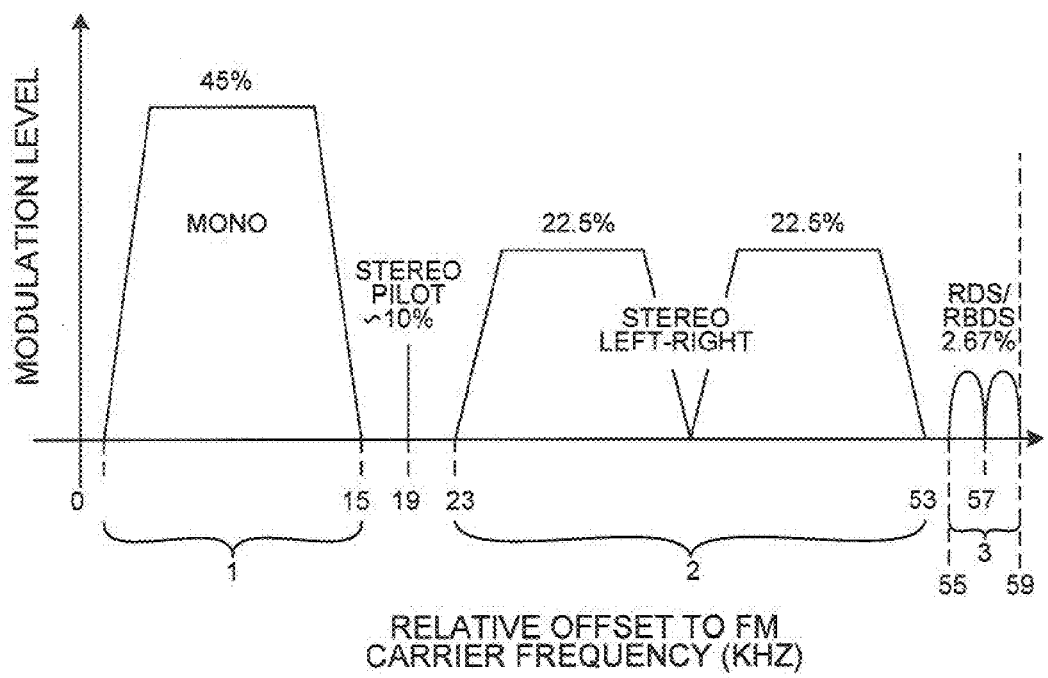
FIG. 1 (Prior Art) is a diagram that shows a 59 KHz wide frequency range relative to a FM carrier frequency.
Figure 2:
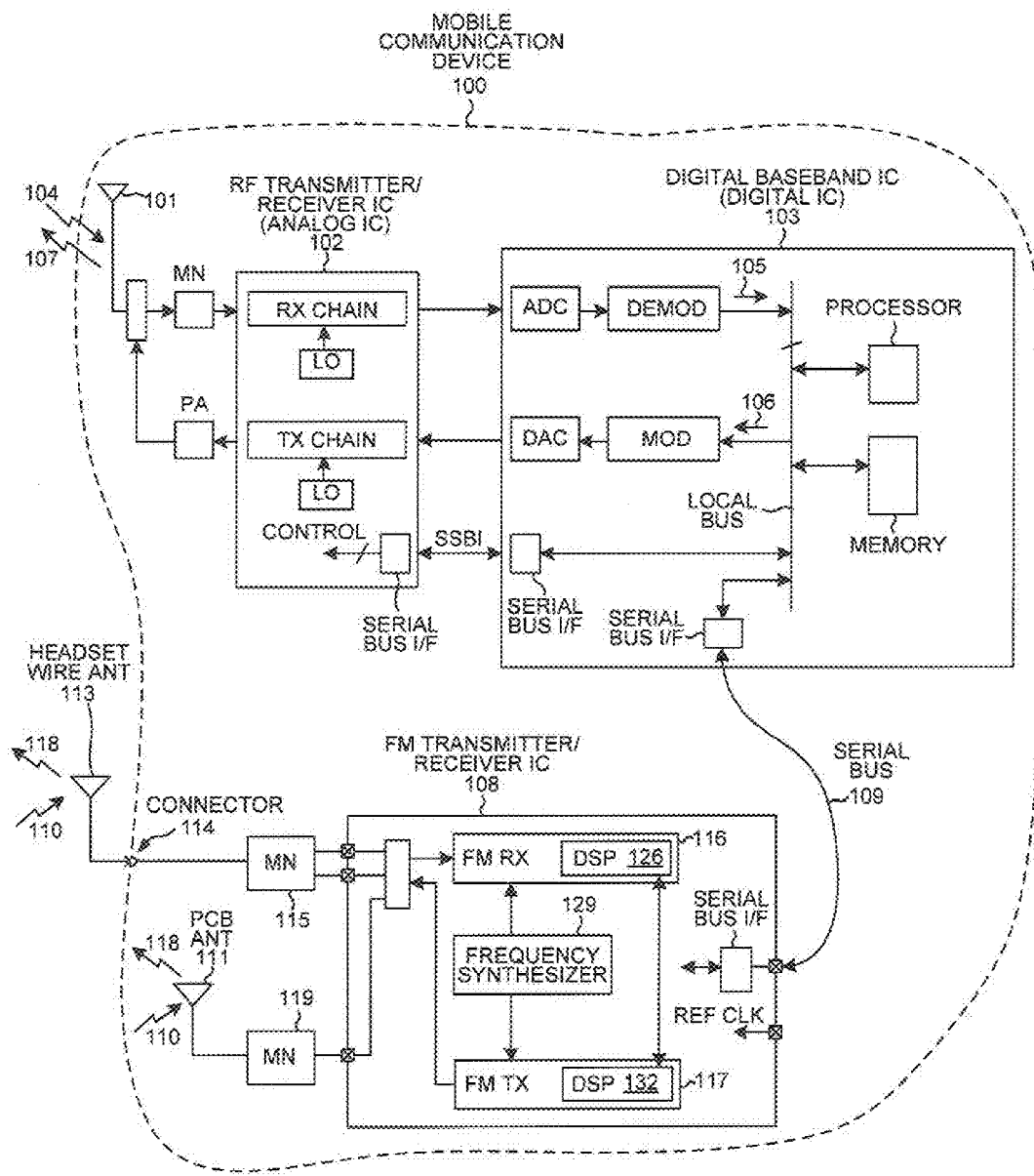
FIG. 2 is a simplified diagram of a mobile communication device 100 in accordance with one novel aspect.

FIG. 2 is a very simplified high level block diagram of one particular type of mobile communication device 100 that carries out a Phase-Locked Loop (PLL) bandwidth adjustment method in accordance with one aspect. In the present example, mobile communication device 100 is a battery-powered handheld device such as a cellular telephone. Cellular telephone 100 includes (among other parts not illustrated) an antenna 101 usable for receiving and transmitting cellular telephone communications, an RF transceiver integrated circuit 102, and a digital baseband integrated circuit 103. In one very simplified explanation of the operation of the cellular telephone, if the cellular telephone is being used to receive audio information as part of a cellular telephone conversation, then an incoming transmission 104 is received on antenna 101. The signal is amplified and downconverted and filtered in RF transceiver integrated circuit 102. After being digitized, demodulated and decoded in digital baseband integrated circuit 103, the resulting audio information 105 may, for example, be used to drive a speaker (not shown) such that a user of the cellular telephone can hear another speaker in the cellular telephone conversation. If, on the other hand, cellular telephone 100 is to be used to transmit to audio information as part of the cellular telephone conversation, then a microphone (not shown) that is part of the mobile communication device receives sound and converts that sound into an electrical signal. The electrical signal is converted into a stream of digital values of audio information 106. Audio information 106 is encoded, modulated and converted into analog form in digital baseband integrated circuit 103. The resulting analog signal is filtered and upconverted in RF transceiver integrated circuit 102. After being amplified, the signal is transmitted from antenna 101 as transmission 107. This explanation of cellular telephone operation is very simplified and is presented here to provide a context for explaining operation of the PLL bandwidth adjustment method.

In addition to the cellular telephone functionality described above, cellular telephone 100 has an ability to receive and to transmit FM radio communications (FM VHF broadcast band communications from approximately 76 MHz to approximately 108 MHz). To provide this FM microtransmitter radio functionality, cellular telephone 100 includes a FM transmitter/receiver integrated circuit 108 that is coupled to digital baseband integrated circuit 103 via a serial bus 109. A user may, for example, use cellular telephone 100 to receive and to listen to ordinary FM broadcast radio stations in the FM VHF band. When cellular telephone 100 is used in this way, an FM radio signal 110 is received onto a printed circuit board (PCB) antenna 111, and is supplied via a matching network 119 to FM transmitter/receiver integrated circuit 108. In the alternative, if a headset 113 is attached to the cellular telephone via a connector 114, then FM radio signal 110 is received onto antenna 113 and is supplied via matching network 115 to FM transmitter/receiver integrated circuit 108. The incoming FM signal is demodulated by an FM receiver functionality 116. The resulting information received can then be communicated via serial bus 109 to digital baseband integrated circuit 103. Digital baseband integrated circuit 103 can then drive the speaker or headset of the user such that the user can listen to the FM broadcast information. In this way, a user of cellular telephone 100 can use cellular telephone 100 to listen to ordinary FM radio stations in the 76 MHz to 108 MHz FM band.

Cellular telephone 100 may also be used to transmit FM signals in the same FM VHF band. A user may, for example, use the audio system of an automobile or of a home stereo system to listen to audio information stored on the cellular telephone. In one example, an audio file such as an MP3 file is stored on cellular telephone 100 and the user wishes to hear audio of the file on the sound system of the user's automobile. To do this, the MP3 file is communicated from digital baseband integrated circuit 103 via serial bus 109 to FM transmitter/receiver integrated circuit 108. The MP3 information is converted into a stream of audio information that is then FM modulated onto a carrier by an FM transmitter functionality 117. An FM radio signal is then driven onto antenna 111 or onto antenna 113 if it is provided. The resulting FM transmission 118 may then be received by the FM radio tuner in the user's automobile. The FM radio of the automobile then receives the FM transmission 118 and drives the speakers in the automobile as it would if it were tuned to receive an ordinary FM radio station. In this way, the user can use cellular telephone 100 to play MP3 music in the user's automobile where the MP3 music is stored in cellular telephone 110. This can be accomplished without connecting any wires between cellular telephone 100 and the FM radio system of the automobile.

Figure 3:
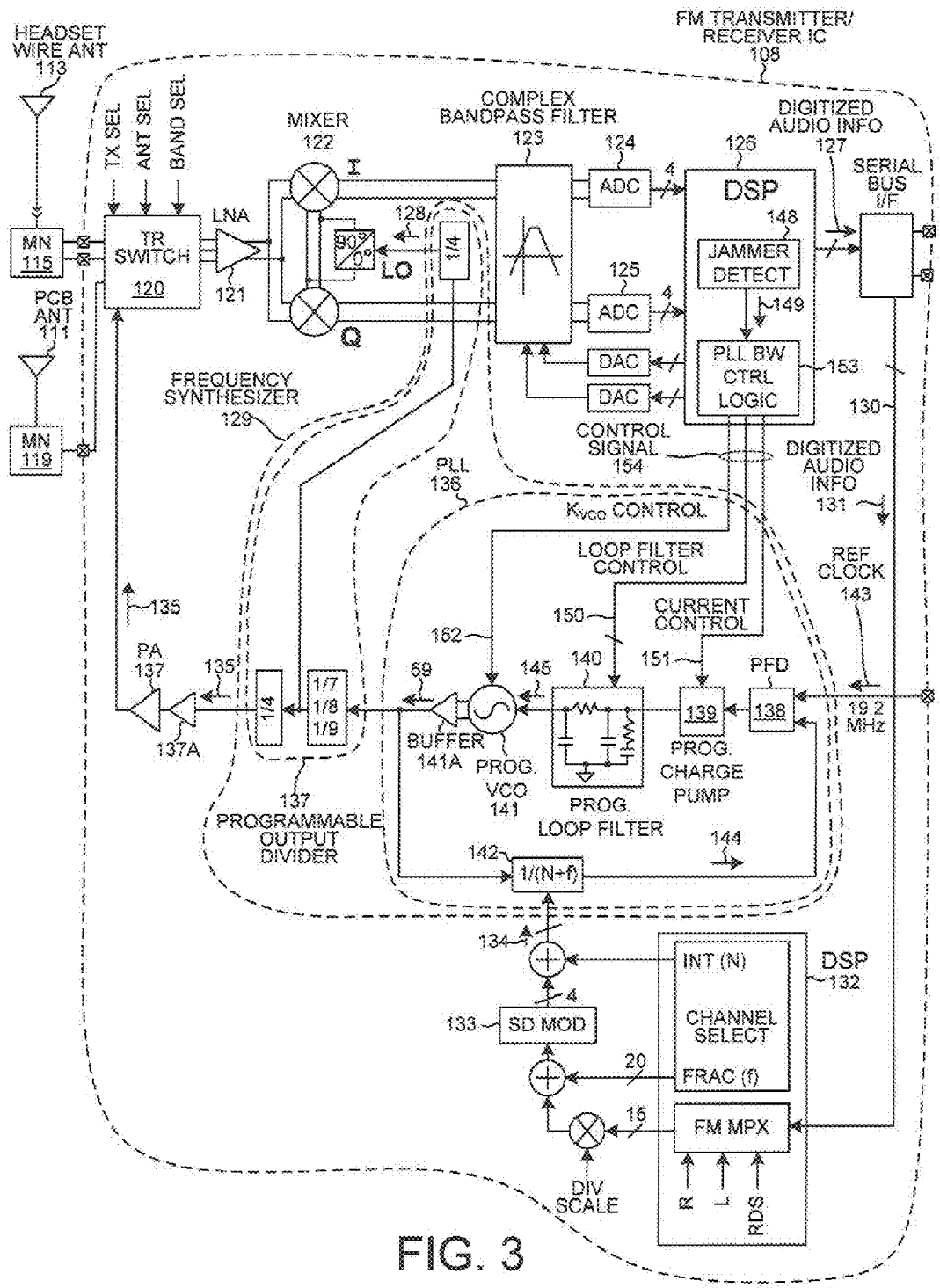
FIG. 3 is a more detailed diagram of the FM transmitter/receiver integrated circuit 108 of the mobile communication device of FIG. 2.

FIG. 3 is a more detailed diagram of the FM transmitter/receiver integrated circuit 108 of FIG. 2. The FM receive path extends from PCB antenna 111 or from headset wire antenna 113, through a transmit/receive (TR) front end switch 120, through a low noise amplifier (LNA) 121, through a mixer block 122, through a complex bandpass filter 123, through a pair of analog-to-digital converters (ADCs) 124 and 125, and to a Digital Signal Processor (DSP) 126. A local oscillator signal (LO) 128 generated by a frequency synthesizer 129 is supplied to the mixer block 122. Arrow 127 represents the resulting stream of digitized audio information.

The FM transmit path extends from conductors 130. Arrow 131 represents the incoming stream of digitized audio information. A DSP 132 and an associated sigma-delta modulator 133 operate together to supply a stream 134 of digital values to the frequency synthesizer 129. This stream of digital values 134 causes the frequency synthesizer 129 to output an FM signal 135. FM signal 135 is buffered by buffer 137A and is amplified by a power amplifier (PA) 137. FM signal 135 then passes through TR switch 120, and to an antenna (111 and/or 113) for transmission. Accordingly, the same frequency synthesizer 129 is used in both the receive path and in the transmit path.

Frequency synthesizer 129 includes a fractional-N Phase-Locked Loop (PLL) portion 136 and a programmable output divider portion 137. PLL portion 136 includes a Phase-Frequency Detector (PFD) 138, a charge pump 139, a loop filter 140, a Voltage-Controlled Oscillator (VCO) 141, a VCO buffer 141A, and a loop divider 142. A 19.2 MHz reference clock signal 143 is supplied from an external reference (for example, from an external crystal oscillator). PFD 138 compares the phase of a feedback signal 144 to the phase of the reference clock signal 143, and controls charge pump 139 appropriately such that a DC control signal 145 supplied to VCO 141 is increased or decreased. The DC control signal 145 is increased or decreased such that the phase of feedback signal 144 is remains locked to the phase of the reference clock signal 143. Arrow 59 identifies the VCO output signal after buffering by buffer 141A.

In an FM receiver such as the FM receiver of FIG. 3, limits are placed on the amount of permissible phase noise in the local oscillator signal LO 128. Phase noise is a quantity that indicates the degree of spectral purity of the LO signal. Equation 4 below is an equation for total phase noise in the local oscillator signal LO 128.

$$S_{\theta total}(f) = S_{\theta CP}(f) + S_{\theta Tdiv}(f) + S_{\theta VCO}(f) + \frac{S_{\theta FLT}(f)}{2} + S_{\theta REF}(f) + S_{\theta BUFF}(f) + S_{\theta \Sigma \Delta}(f) \qquad \text{Eq. (4)}$$

As indicated by Equation 4, total phase noise includes several components including a component $S_{\theta CP}$ due to charge pump 139, a component $S_{\theta Tdiv}$ due to loop divider 142, a component $S_{\theta VCO}$ due to VCO 141, a component $S_{\theta FLT}$ due to loop filter 140, a component $S_{\theta REF}$ due to noise in the input reference clock signal 143, a component $S_{\theta BUFF}$ due to the VCO output buffer 141A, and a component $S_{\theta \Sigma \Delta}$ due to sigma delta modulator 133.

Figure 4:
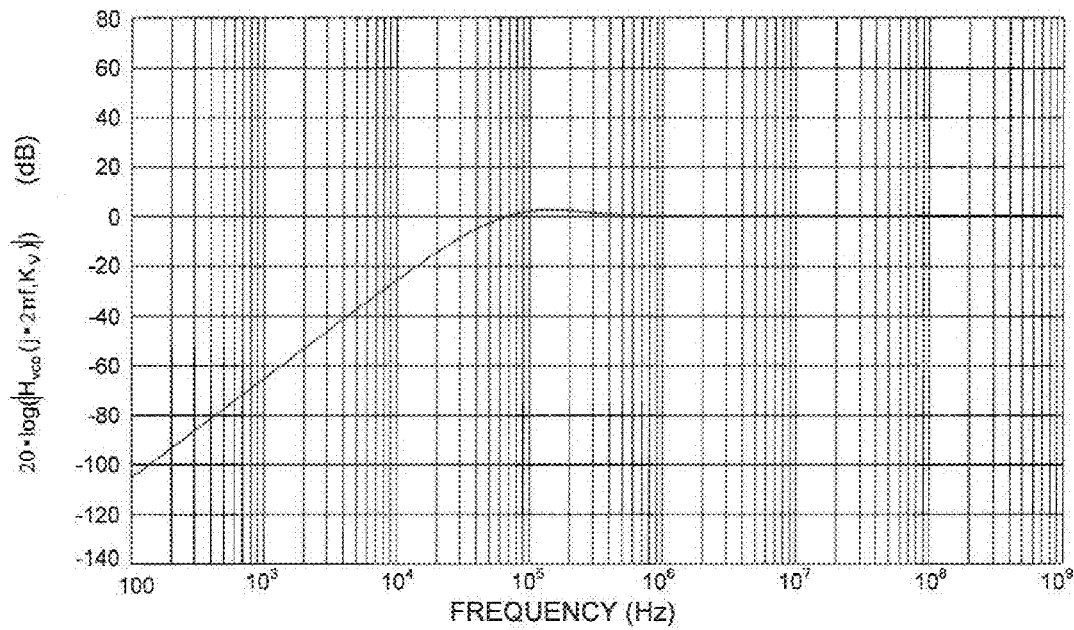
FIG. 4 is a diagram that shows how the VCO phase noise contribution to total PLL phase noise varies as a function of frequency.

FIG. 4 is a diagram that shows how the VCO phase noise contribution to total phase noise varies as a function of frequency.

Figure 5:
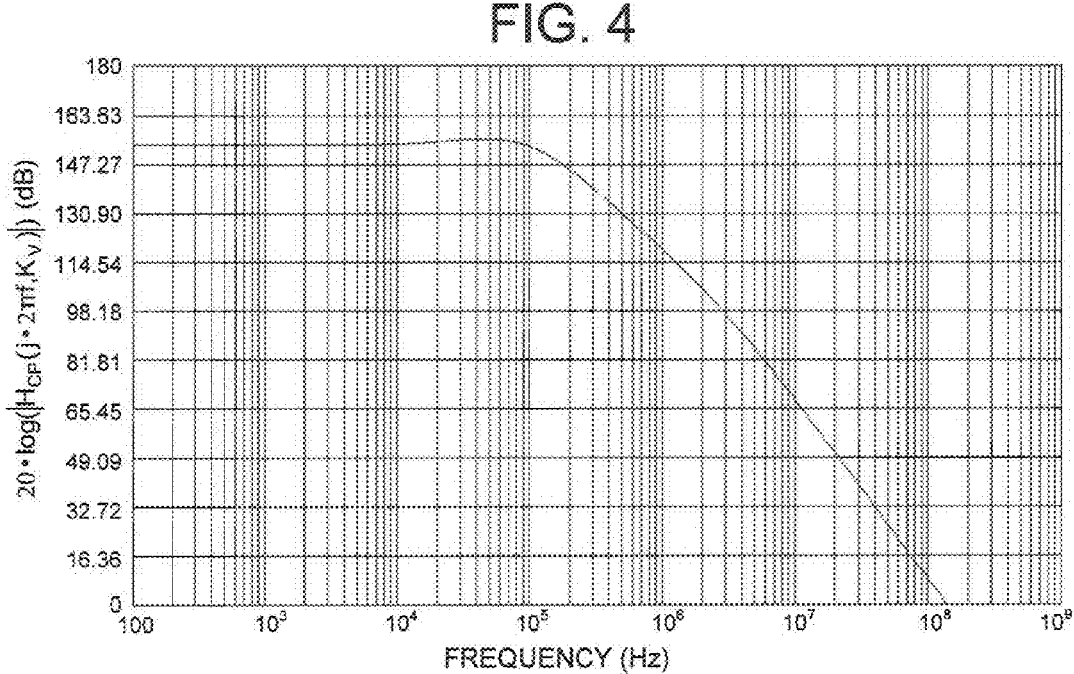
FIG. 5 is a diagram that shows how the charge pump phase noise contribution to total PLL phase noise varies as a function of frequency.

FIG. 5 is a diagram that shows how the charge pump phase noise contribution to total phase noise varies as a function of frequency.

Figure 6:
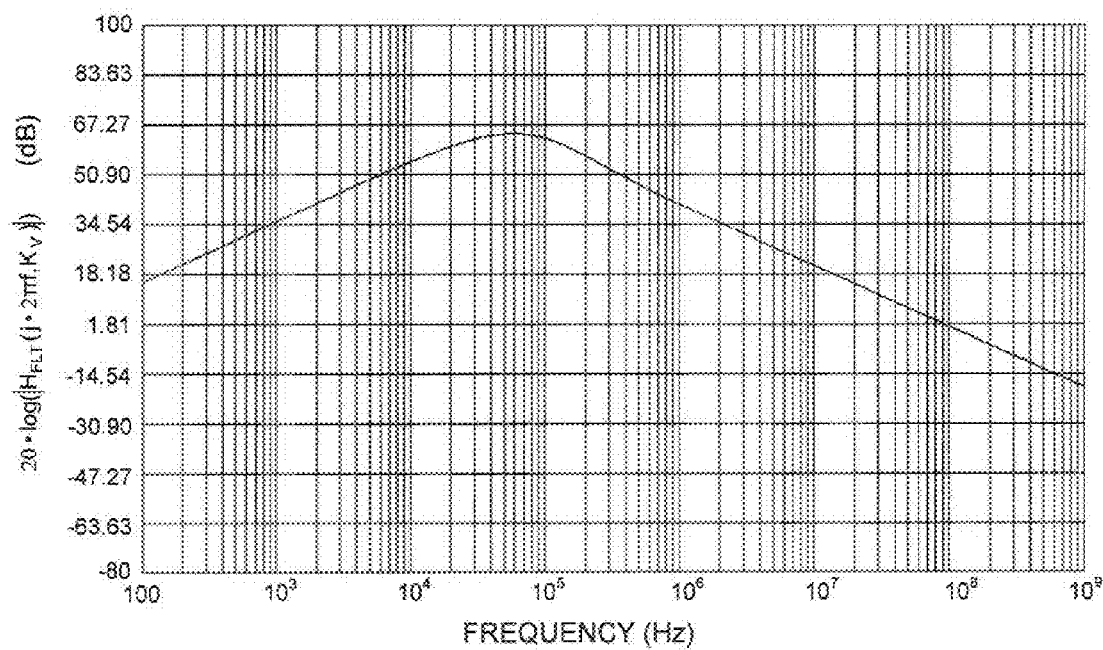
FIG. 6 is a diagram that shows how the loop filter phase noise contribution to total PLL phase noise varies as a function of frequency.

FIG. 6 is a diagram that shows how the loop filter phase noise contribution to total phase noise varies as a function of frequency.

In one novel aspect, residual FM phase noise requirements imposed on the FM receiver are considered and SSB phase noise requirements imposed on the FM receiver are considered. First, it is recognized that if no jammer is present, then the residual FM phase noise requirements are generally more difficult to meet than are the out-of-band SSB phase noise requirements. Audio quality is generally limited in a conventional FM receiver due to in-band residual FM approaching residual FM phase noise requirements, whereas SSB phase noise requirements are easily satisfied. Increasing PLL loop bandwidth generally serves to improve residual FM (decrease residual FM) but unfortunately also serves to degrade out-of-band SSB phase noise (increase out-of-band SSB phase noise).

Second, it is further recognized that if a jammer is present, then the out-of-band SSB phase noise requirements are generally more stringent than are the residual FM phase noise requirements. Audio quality is generally limited in a conventional FM receiver due to out-of-band SSB phase noise approaching the out-of-band SSB phase noise requirements, whereas the residual FM phase noise requirements are generally satisfied by some margin. Decreasing PLL loop bandwidth generally serves to improve out-of-band SSB phase noise (decrease SSB phase noise) but unfortunately also serves to degrade residual FM phase noise (increase residual FM phase noise).

It is further recognized that the presence of a jammer can often be detected. This detection is performed in software or firmware by a jammer detection functionality 148 in DSP 126 of FIG. 3. The software or firmware program of processor-executable instructions (also referred to a computer-executable instructions) is stored in a processor-readable medium (also referred to as a computer-readable medium) that is in or is coupled to DSP 126. The instructions are executed by DSP 126.

Figure 7:
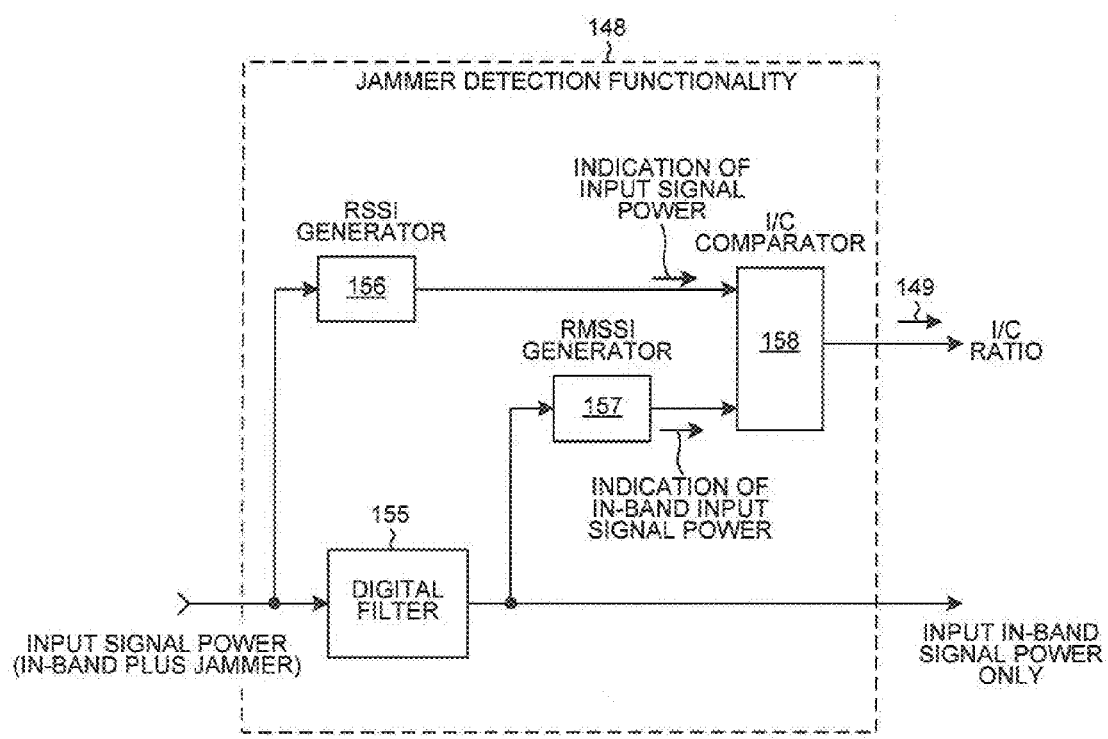
FIG. 7 is a diagram of the jammer detection functionality 148 of FIG. 3.

FIG. 7 is a more detailed functional diagram of one example of jammer detection functionality 148. The presence of a jammer is detected by comparing the total power I of the incoming received signal before a digital filtering operation (RSSI) with the total power C of the incoming received signal after the digital filtering operation (RMSSI). Function block 155 in FIG. 7 represents the digital filtering operation. RSSI stands for Received Signal Strength Indicator. The RSSI indicator is generated by function block 156 of FIG. 7. RMSSI stands for Received Mean Strength Signal Indicator. The RMSSI indicator is generated by function block 157 of FIG. 7. Comparator block 157 compares the RSSI and RMSSI indicators and generates an IX ratio 149. The I/C ratio indicates both the presence of a jammer, as well as the strength of the jammer. I/C ratio 149 is an indication of whether a jammer is present or not. This determination is but one way that the presence of a jammer can be detected. Any other suitable way of detecting a jammer can be employed.

Figure 8:
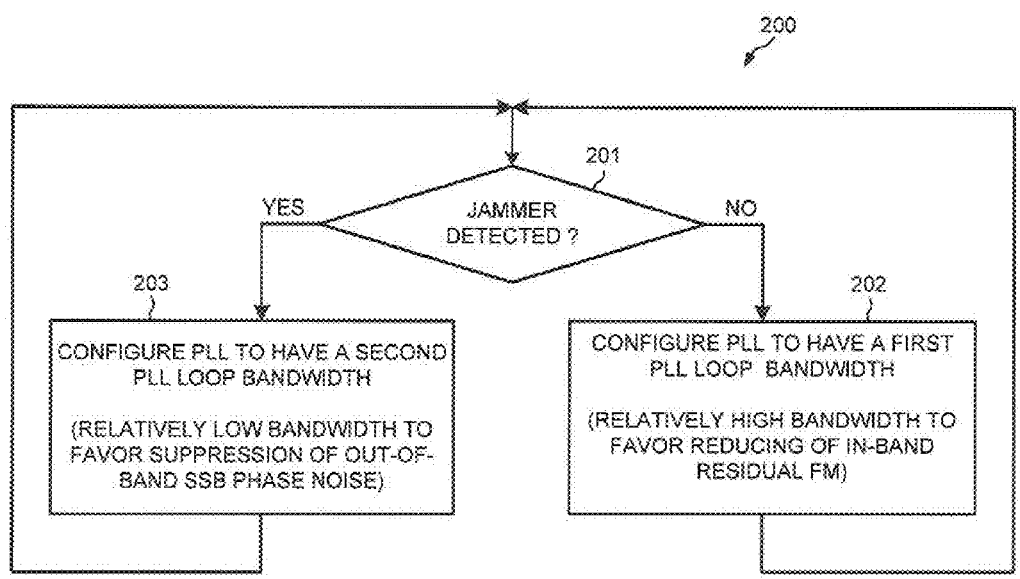
FIG. 8 is a flowchart of a method 200 of adjusting PLL loop bandwidth based on jammer detection information. If no jammer is detected then a relatively high PLL loop bandwidth is used, whereas if a jammer is detected then a relatively low PLL loop bandwidth is used.

FIG. 8 is a flowchart of a jammer detection based PLL bandwidth adjustment method 200 in accordance with one novel aspect. If a jammer is not detected (step 201), then PLL 136 is controlled to have a first PLL loop bandwidth (step 202). The first PLL loop bandwidth is relatively high in order to favor and facilitate suppression of in-band residual FM. In one example, the FM receiver of integrated circuit 108 is simulated or tested in operating conditions in which no jammer is present, and the optimum PLL loop bandwidth that results in the best audio quality is recorded, considering all requirements including residual FM requirements and out-of-band SSB phase noise requirements. This determined PLL bandwidth is the first PLL loop bandwidth. In one specific example, this first bandwidth is 183 KHz.

If, however, a jammer is detected (step 201), then PLL 136 is controlled to have a second PLL loop bandwidth (step 203). The second PLL loop bandwidth is relatively low (as compared to the first PLL bandwidth) in order to favor suppression of out-of-band SSB phase noise. In one example, the FM receiver of integrated circuit 108 is simulated or tested in operating conditions in which a jammer is present, and the optimum PLL loop bandwidth that results in the best audio quality is recorded, considering all requirements including residual FM requirements and out-of-band SSB phase noise requirements. This determined PLL loop bandwidth is the second PLL loop bandwidth. In one specific example, this second bandwidth is 125 KHz.

Figures 9, 10:
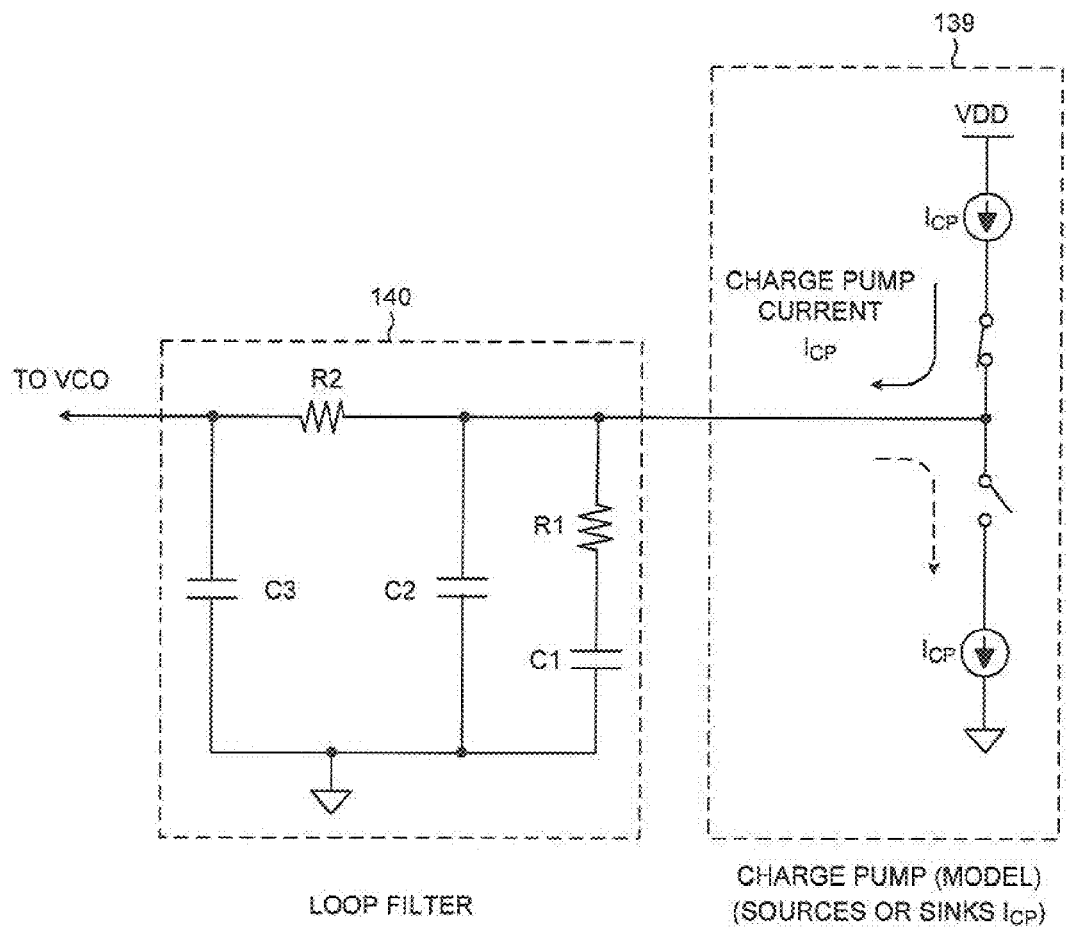
FIG. 9 is a more detailed diagram of the loop filter 140 and the charge pump 139 in the PLL 136 of the FM transmitter/receiver integrated circuit 108 of FIG. 3.
FIG. 10 is a table that sets forth the various possible settings of the circuit elements of loop filter 140 and charge pump 139 of FIG. 9.

To facilitate changing the loop bandwidth of PLL 136, loop filter 140 is a programmable loop filter. FIG. 9 is a more detailed diagram of programmable loop filter 140. Programmable loop filter 140 includes resistance elements R1 and R2 that have digitally-controlled variable resistances. Programmable loop filter 140 also includes capacitance elements C1, C2 and C3 that have digitally-controlled capacitances. The resistances and capacitances of the resistance elements and capacitance elements are determined by a multi-bit digital loop filter control value on conductors 150 of FIG. 3. To facilitate changing the loop bandwidth of PLL 136, charge pump 139 is also a programmable charge pump. If the one-bit digital current control value on conductor 151 of FIG. 3 has a first digital value, then charge pump 139 is controlled to sink and source a first amount of current $I_{CP}$, whereas if the one-bit digital current control value on conductor 151 has a second digital value, then charge pump 139 is controlled to sink and source a second amount of current $I_{CP}$. Although not utilized in the particular operational example described here, the tuning sensitivity (Kvco) of VCO 141 is variable and can be set to have one of two values as determined by a one-bit digital $K_{VCO}$ control value supplied to VCO 141 via conductor 152. In the presently described operational example, the tuning sensitivity of VCO 141 is set to have a constant value and the one-bit digital control value on conductor 152 is not changed. PLL bandwidth control logic functionality 153 within DSP 126 generates the digital control values on conductors 150, 151, and 152 based at least in part on whether or not a jammer has been detected as determined by jammer detection functionality 148. The control values on conductors 150, 151 and 152 together form a multi-bit control signal 154. Upon detection of a jammer by jammer detection functionality 148, the value of the multi-bit control signal 154 changes from a first value to a second value such that the bandwidth of the PLL changes from the first PLL loop bandwidth to the second PLL loop bandwidth. If after a time the jammer detection functionality 148 no longer detects the jammer, then the value of multi-bit control signal 154 changes from the second value to the first value such that the PLL loop bandwidth is changed back from the second PLL loop bandwidth to the first PLL loop bandwidth.

FIG. 10 is a table that sets forth the different resistance, capacitance, and current values that the various resistance elements, capacitance elements, and current source elements of FIG. 9 can be controlled to have. For example, capacitance element C1 of FIG. 9 can be set to have a selectable one of sixteen capacitances in a range from 25 picofarads to 220 picofarads. A four-bit digital value determines which of these sixteen capacitances the capacitor C1 will have. Similarly, the resistance of resistance element R1 is determined by another four-bit digital value. The capacitance of capacitance element C2 is determined by a three-bit digital value. The resistance of resistance element R2 is determined by a one-bit digital value. All these digital values are supplied together to loop filter 140 via conductors 150. Similarly, the charge pump current $I_{CP}$ can be set to have a value of 39 microamperes, or a value of 85 microamperes. Which of these two current values it is that charge pump 139 will sink and source is determined by the one-bit digital current control value supplied via conductor 151 to charge pump 139.

FIG. 11 is a table that sets forth one particular example of how PLL 136 of FIG. 3 is configured in step 202 (in method 200 of FIG. 8) to have a first relatively high PLL loop bandwidth, and how PLL 136 is configured in step 203 to have the second relatively low PLL loop bandwidth. Column 300 sets forth how the values of circuit elements R1, R2, C1, C2 and C3 and the charge pump current $I_{CP}$ are set such that the PLL loop bandwidth has its first bandwidth value of approximately 183 KHz. As indicated in the flowchart of FIG. 8, these settings are used if no jammer is detected. This first high PLL loop bandwidth results in optimal audio quality in operating conditions involving no jammer. Column 301, on the other hand, sets forth how the values of circuit elements R1, R2, C1, C2 and C3 and the charge pump current $I_{CP}$ are set such that the PLL loop bandwidth has its second relatively low bandwidth value of approximately 125 KHz. As indicated in the flowchart of FIG. 8, these settings are used if a jammer is detected. The low PLL loop bandwidth results in optimal audio quality in operating conditions involving a jammer. The capacitances of the capacitance elements C1, C2 and C3 are not changed when switching between the two PLL loop bandwidth configurations, thereby minimizing disturbances to the PLL and reducing PLL settling time.

Figure 12:
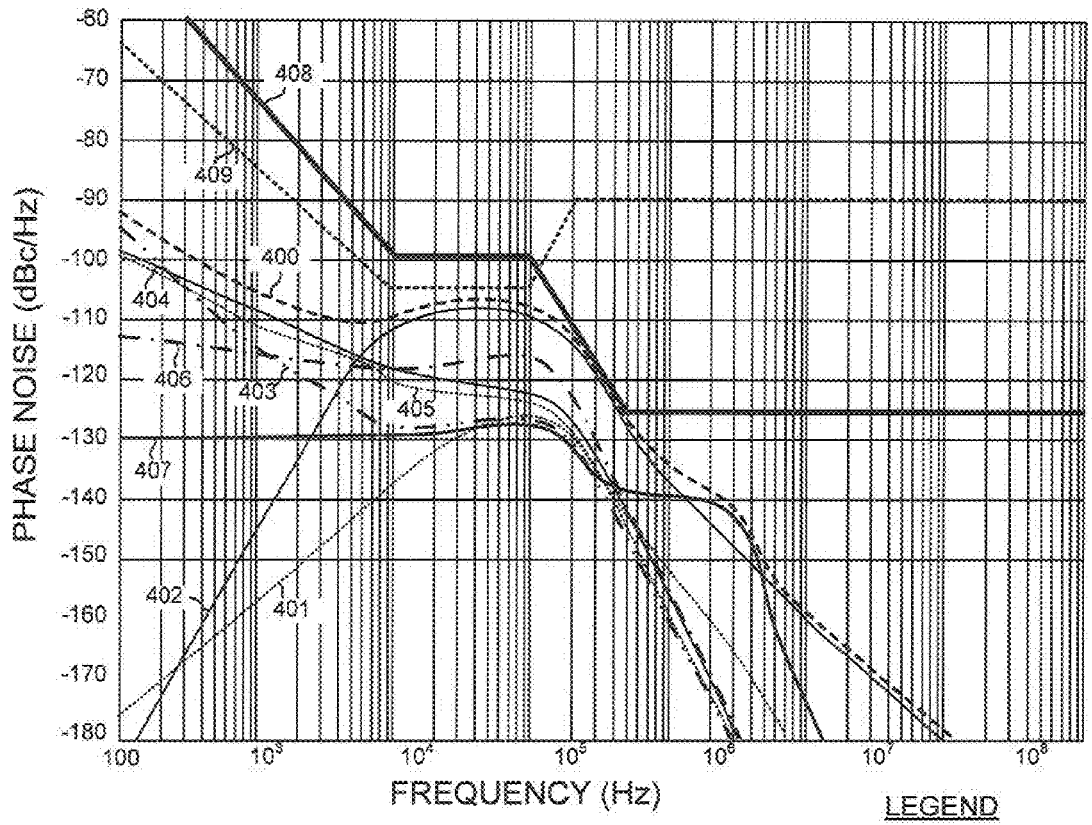
FIG. 12 is a graph showing how the total phase noise of the PLL 136 of FIG. 3 varies over frequency in an operational condition in which no jammer is detected and in which the PLL loop bandwidth has its first relatively high value of 183 KHz in accordance with the method of FIG. 8.

FIG. 12 is a graph showing how the total phase noise 400 of PLL 136 of FIG. 3 varies over frequency in an operational condition in which no jammer is detected and in which the PLL loop bandwidth has its first relatively high value of 183 KHz. Total phase noise 400 is below the receiver mask 408 at all frequencies.

Figure 13:
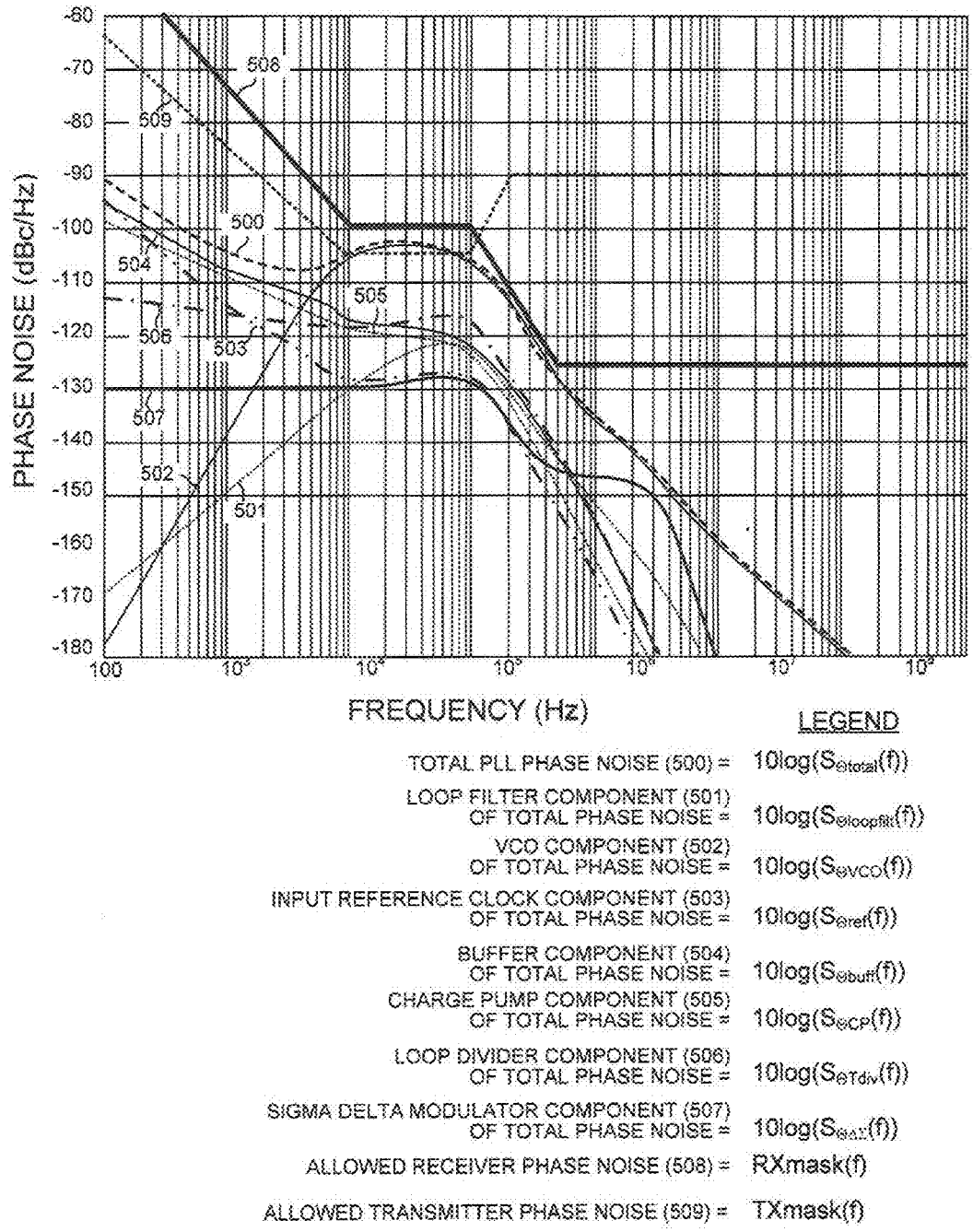
FIG. 13 is a graph showing how the total phase noise of the PLL 136 of FIG. 3 varies over frequency in an operational condition in which a jammer is detected and in which the PLL loop bandwidth has its second relatively low value of 125 KHz in accordance with the method of FIG. 8.

FIG. 13 is a graph showing how the total phase noise 500 of PLL 136 of FIG. 3 varies over frequency in an operational condition in which a jammer is detected and in which the PLL loop bandwidth has its second relatively low value of 125 KHz. Total phase noise 500 is below the receiver mask 508 at all frequencies.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Jammer detection can be carried out in software as illustrated in FIG. 3, or can be carried out by hardware circuitry. Jammer detection can occur in the same integrated circuit that contains the PLL, or can occur in another integrated circuit that does not contain the PLL. The ways of changing PLL loop bandwidth set forth above are but examples. Other PLL circuit components can be controlled to change PLL loop bandwidth, and the PLL circuit components that are described as being controlled in the description above can be controlled in other ways to change PLL loop bandwidth. The determination to change PLL loop bandwidth need not depend entirely on whether or not a jammer has been detected, but rather may also depend in part on other information. Although the jammer detection based adaptive PLL bandwidth adjustment method is described above in connection with a cellular telephone example involving an FM microtransmitter, the method sees general applicability in FM receivers. Accordingly, various modifications, adaptations, and combinations of the various features of the described specific embodiments can be practiced without departing from the scope of the claims that are set forth below.

What is claimed is:

1. A method comprising:
   detecting a jammer; and
   based at least in part on the detection of the jammer, changing a loop bandwidth of a Phase-Locked Loop (PLL) within a Frequency Modulation (FM) radio receiver from a first loop bandwidth to a second loop bandwidth, wherein detecting the jammer includes comparing a power of a signal before a digital filtering operation with a power of the signal after the digital filtering operation.

2. The method of claim 1, wherein the FM radio receiver is operable to receive FM broadcast radio communications in a frequency band from approximately 76 MHz to approximately 108 MHz.

3. The method of claim 1, wherein the digital filtering operation occurs in the FM radio receiver, and wherein the detecting of the jammer occurs in the FM radio receiver.

4. The method of claim 1, wherein the PLL includes a loop filter, wherein the loop filter includes a resistance element that has a variable resistance, and wherein the variable resistance is changed from a first resistance to a second resistance during a change of the loop bandwidth of the PLL.

5. The method of claim 4, wherein the loop filter includes a capacitance element that has a variable capacitance, and wherein the variable capacitance is not changed when the variable resistance is changed from the first resistance to the second resistance during the change of the loop bandwidth of the PLL.

6. The method of claim 4, wherein the loop filter includes no capacitance element whose capacitance is changed when the resistance of the variable resistance is changed from the first resistance to the second resistance during a change of the loop bandwidth of the PLL.

7. The method of claim 1, wherein the PLL includes a loop filter, wherein the loop filter includes a capacitance element that has a variable capacitance, and wherein the variable capacitance is changed from a first capacitance to a second capacitance during a change of the loop bandwidth of the PLL.

8. The method of claim 1, wherein the PLL includes a charge pump, and wherein the change of the loop bandwidth of the PLL involves changing a current sourcing capability of the charge pump from a first current source amount to a second current source amount.

9. The method of claim 1, wherein the PLL includes a Voltage Controlled Oscillator (VCO), and wherein the change of the loop bandwidth of the PLL involves changing a tuning sensitivity (Kvco) of the VCO.

10. The method of claim 1, wherein the first loop bandwidth is greater than the second loop bandwidth.

11. A method comprising:
    operating a Phase-Locked Loop (PLL) within a Frequency Modulation (FM) radio receiver with a first loop bandwidth in a first operating condition in which no jammer is detected; and
    operating the PLL with a second loop bandwidth in a second operating condition in which a jammer is detected, wherein detection of the jammer includes comparing a power of a signal before a digital filtering operation with a power of the signal after the digital filtering operation, and wherein the first loop bandwidth is greater than the second loop bandwidth.

12. A Frequency Modulation (FM) receiver comprising:
    jammer detection functionality that outputs a signal; and
    a Phase-Locked Loop (PLL), wherein a loop bandwidth of the PLL is changed based at least in part on a change of a value of the signal from a first value to a second value, wherein the value of the signal changes from the first value to the second value when a jammer is detected, wherein the loop bandwidth of the PLL includes a first bandwidth when the jammer detection functionality provides the first value to the PLL and wherein the loop bandwidth of the PLL includes a second bandwidth when the jammer detection functionality provides the second value to the PLL.

13. The FM receiver of claim 12, wherein the jammer detection functionality detects the jammer.

14. The FM receiver of claim 12, wherein the first bandwidth is greater than the second bandwidth.

15. The FM receiver of claim 12, wherein the PLL includes a loop filter, wherein the loop filter includes a plurality of resistance elements and a plurality of capacitance elements, and wherein the loop bandwidth of the PLL is changed by changing a resistance of at least one of the resistance elements without changing a capacitance of any capacitance element of the loop filter.

16. The FM receiver of claim 12, wherein the signal is a multi-bit digital signal that is supplied by the jammer detection functionality to the PLL.

17. The FM receiver of claim 12, wherein the first and second values determine a filter characteristic of a loop filter within the PLL.

18. The FM receiver of claim 12, wherein the first and second values determine a magnitude of a current sourced by a charge pump within the PLL.

19. The FM receiver of claim 12, wherein the PLL includes a programmable loop filter, wherein the first and second values are multi-bit digital control values, and wherein at least one of a plurality of bits of the first and second values is supplied to the programmable loop filter.

20. The FM receiver of claim 12, wherein the PLL includes a programmable charge pump, wherein the first and second values are multi-bit digital control values, and wherein at least one of a plurality of bits of the first and second values is supplied to a programmable loop filter.

21. A Frequency Modulation (FM) receiver comprising:
a Phase-Locked Loop (PLL) that has a loop bandwidth, wherein the loop bandwidth is automatically adjusted based at least in part on jammer detection information indicating whether a jammer is present at the FM receiver when the FM receiver is receiving an FM signal, wherein the loop bandwidth has a first bandwidth in response to a determination that no jammer is present, and wherein the loop bandwidth has a second bandwidth in response to a determination that the jammer is present.

22. The FM receiver of claim 21, wherein the PLL is a part of a frequency synthesizer, wherein the frequency synthesizer generates a Local Oscillator (LO) signal used in a demodulation of the FM signal, and wherein the FM signal has a carrier of a frequency between approximately 76 MHz and approximately 108 MHz.

23. An apparatus comprising:
a Phase-Locked Loop (PLL) that has a loop bandwidth, wherein the PLL is a part of a frequency synthesizer that generates a Local Oscillator (LO) signal within a Frequency Modulation (FM) receiver; and
means for changing the loop bandwidth of the PLL based at least in part on jammer detection information, wherein the jammer detection information indicates whether a jammer has been detected during operation of the FM receiver, wherein the loop bandwidth has a first bandwidth in response to a determination that no jammer is present, and wherein the loop bandwidth has a second bandwidth in response to a determination that the jammer is present.

24. The apparatus of claim 23, wherein the means for changing includes a plurality of conductors that are coupled to the PLL, wherein if the plurality of conductors carries a first multi-bit digital control value then the loop bandwidth is the first bandwidth, and wherein if the plurality of conductors carries a second multi-bit digital control value then the loop bandwidth is the second bandwidth.

25. The apparatus of claim 24, wherein the jammer detection information changes during an operation of the FM receiver such that the loop bandwidth of the PLL changes during the operation of the FM receiver.

26. A non-transitory computer-readable medium comprising instructions that, when executed by a computer, cause the computer to:
determine whether a jammer is present; and
change a loop bandwidth of a Phase-Locked Loop (PLL) based at least in part on the determination of whether the jammer is present, wherein the PLL is part of a Frequency Modulation (FM) receiver, wherein the loop bandwidth has a first bandwidth in response to a determination that no jammer is present, wherein the loop bandwidth has a second bandwidth in response to a determination that the jammer is present.

27. The non-transitory computer-readable medium of claim 26, wherein the first bandwidth is greater than the second bandwidth.

28. The non-transitory computer-readable medium of claim 26, wherein the computer is a processor within the FM receiver.

* * * * *